United States Patent [19]

Adams

[11] Patent Number: 4,600,093
[45] Date of Patent: Jul. 15, 1986

[54] BRAKE FOR ROLLER CONVEYORS
[75] Inventor: Arthur R. Adams, Mt. Sterling, Ohio
[73] Assignee: Versa Corporation, Mt. Sterling, Ohio
[21] Appl. No.: 722,393
[22] Filed: Apr. 12, 1985
[51] Int. Cl.[4] .................... B65G 13/075; F16D 69/04; F16D 51/00
[52] U.S. Cl. ................................. 193/35 A; 198/781; 188/250 B; 188/251 A; 188/74
[58] Field of Search .............. 193/35 A, 40; 198/781; 188/250 B, 250 R, 251 A, 74, 242

[56] References Cited
U.S. PATENT DOCUMENTS

| | | | |
|---|---|---|---|
| 1,900,149 | 3/1933 | Anderson | 193/35 A |
| 2,109,871 | 3/1938 | Thode | 188/250 B X |
| 2,360,708 | 10/1944 | Muddiman | 193/35 A |
| 3,621,982 | 11/1971 | Fleischauer | |
| 3,860,106 | 1/1975 | Cooley | 198/781 |
| 4,174,777 | 11/1979 | Riehle | 198/781 |
| 4,253,558 | 3/1981 | Roeing et al. | 193/35 A |
| 4,264,005 | 4/1981 | Smock | |
| 4,273,239 | 6/1981 | Thwaites et al. | 198/781 |

FOREIGN PATENT DOCUMENTS 12740 of 1893 United Kingdom ............ 188/250 B
14170 of 1894 United Kingdom ............ 188/250 B

OTHER PUBLICATIONS

American Brake Shoe and Foundry Company, *The Story of the Brake Shoe*, 1938, pp. 47-49.

Primary Examiner—Joseph F. Peters, Jr.
Assistant Examiner—Mary Beth O. Jones
Attorney, Agent, or Firm—Litman, Day and McMahon

[57] ABSTRACT

An improved brake mechanism for use with roller conveyors is provided. The brake mechanism comprises a brake plate, a brake shoe and a jack mechanism for biasing the brake plate and shoe into and out of braking orientation with conveyor rollers. The brake plate is generally flat and has two rigid extensions thereon. The brake shoe is a resilient, or elastic, loop of material which is stretched between the brake plate extensions and which is securely held thereon by resiliency of the brake shoe material. The brake shoe may be rapidly and easily mounted upon, or removed from, the brake plate without the use of special tools. Preferably, the brake shoe is manufactured from surgical tubing, which generally possesses sufficient resiliency for the application and which has a high enough coefficient of friction to be effective in braking conventional conveyor rollers.

6 Claims, 9 Drawing Figures

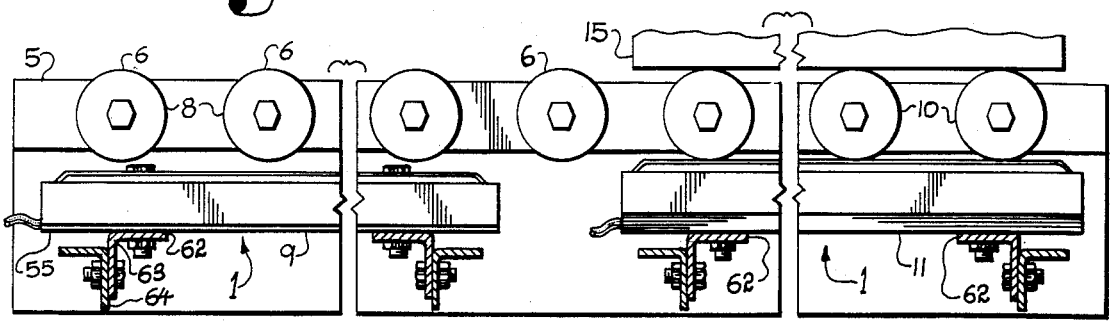
Fig.1.
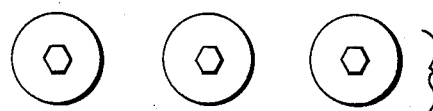
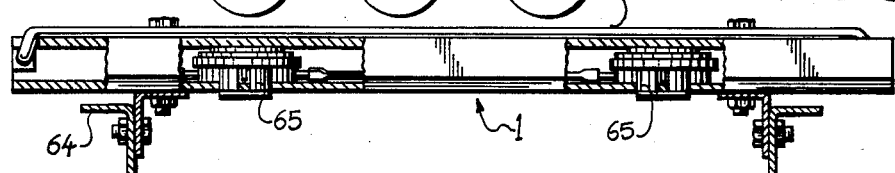
Fig.2.
Fig.3.   Fig.4.
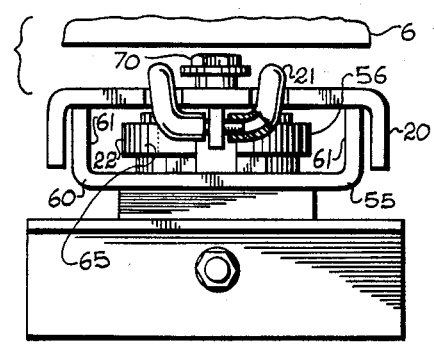 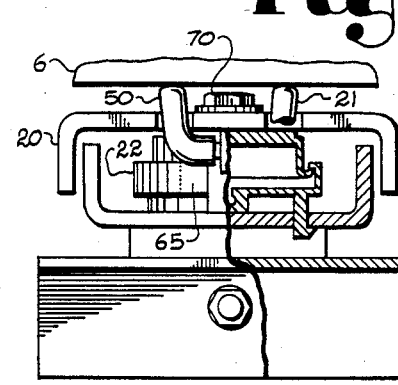
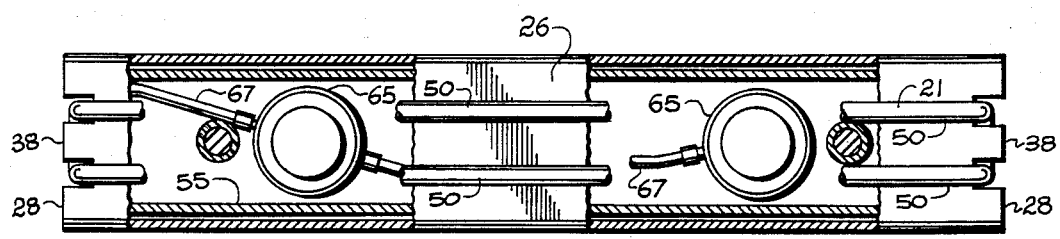
Fig.5.
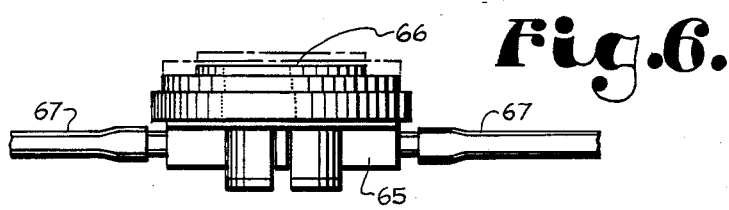
Fig.6.

BRAKE FOR ROLLER CONVEYORS

BACKGROUND OF THE INVENTION

The present invention relates to conveyors and conveyor brakes therefor. In particular, the invention relates to conveyor brakes having readily removable and replaceable brake shoes thereon.

Conventional roller conveyors are well known and generally comprise rows of spaced, parallel aligned rollers, mounted in a track or rail system. Objects, such as packages, roll upon the surfaces of the rollers as they are transferred along a track. Generally, these types of roller conveyors are of two basic types: gravity conveyors, wherein the rollers are unpowered and the track generally runs downhill; and, powered conveyors, wherein the rollers are powered by a drive belt or similar means.

During operation of either type of conventional roller conveyor, there may be times when transport of articles upon the surface of the rollers is desired to be stopped or braked. Generally, these conventional roller conveyors include certain brake mechanisms which stop certain selected rollers from rotation. When this occurs, packages in engagement with those rollers cease to move along the conveyor. Conventional brake mechanisms for roller conveyors generally comprise brake plates having brake shoes mounted thereon. When a brake plate is selectively motivated, the shoe is pressed against the roller, preventing rotation. Conventional brake mechanisms are generally similar for both types of roller conveyors, except with powered roller conveyors, a clutch or similar mechanism usually disengages the drive to the rollers at the same time the brake is applied.

In the past, methods used for mounting the brake shoes upon the brake plates have been relatively permanent. That is, generally the brake shoe is mounted as by an adhesive or by mechanical means requiring special tools, or the like, for mounting and dismounting. This has resulted in several basic types of problems. First, when the brake shoe material wears out, substantial down time may be necessary while the brake shoes are replaced. Secondly, conventional methods of attachment of the brake shoe to the brake plate can be relatively expensive and can often require special mechanical structures or tools. In addition, simply checking the brake shoes often can require a significant length of time and can require operators with special skill. As will be seen from the following disclosure, the present invention substantially solves these problems.

SUMMARY OF THE INVENTION

A conveyor brake mechanism is provided for stopping, or braking, rotation of selected rollers in various types of roller conveyors. The brake mechanism comprises a brake plate, motive means, and a brake shoe especially adapted to be readily removable and replacable in the brake mechanism.

In the preferred embodiment, the brake plate generally comprises an elongate, rectangular plate having a brake shoe engaging surface, elongate parallel side edges and parallel end edges. The brake plate is generally selectively movable between two extreme orientations: a first non-braking orientation; and a second braking orientation. When moved into the braking orientation, the brake plate forces the brake shoe into the roller or rollers to be braked, preventing rotation. When the brake plate is in the first non-braking orientation the brake shoe is lowered out of engagement with the rollers, which are then free to rotate and to transport articles.

The motive means provides for selective motivation of the brake plate between the first orientation and the second orientation. In the preferred embodiment, the motive means or mechanism includes a frame upon which the brake plate rests when in the non-braking orientation. Pneumatic rams, or jacks, are selectively actuated to bias the brake plate toward the conveyor rollers. Thus, by selectivly pumping air into and out of the pneumatic jacks, the conveyor brake mechanism is actuated.

The brake mechanism includes an attachment mechanism, comprising first and second attachment means, for mounting the brake shoe. Preferably, the first attachment means is a rigid extension mechanism comprising rigid extension members is mounted upon the brake plate, and the brake shoe includes a resilient member, or second attachment means, for engagement therewith.

In the preferred embodiment, the end edges of the brake plate each include a pair of indentations therein. The indentations define oppositely oriented rigid extensions mounted upon, and integral with, the brake plate shoe engaging surface. The brake shoe selectively engages these rigid extensions during mounting upon the brake plate. As will be seen from the below description, resiliency of the brake shoe generally permits rapid and relatively easy disengagement of the brake shoe from the brake plate.

The brake shoe includes a generally elongate loop of resilient material. By "resilient", it is meant that the material stretches significantly, and has considerable propensity to return to its unstretched state, similarly to a rubber band. In the preferred embodiment, the brake shoe comprises an elongate loop of surgical tubing in which opposite ends of the tubing have been mounted aligned generally coaxially with one another to form a substantially continuous loop. The size of the loop of resilient material is determined by the size of the brake plate or, more specifically, the distance between the rigid engagement members.

The brake shoe is easily mounted upon the brake plate by stretching the loop of resilient material between the two oppositely oriented rigid extensions. After mounting, the brake shoe then has two elongate arms extending over the shoe engaging surface of the brake plate. When the brake plate is motivated toward a roller of the conveyor, the brake shoe arms will engage the roller, preventing rotation. The brake shoe arms are generally formed from a material having a sufficiently high coefficient of friction so as to be effective in stopping roller rotation. Generally, surgical tubing and conventional airline tubing possess the necessary characteristics regarding friction.

A variety of designs of brake plates and brake shoes may be utilized in conjunction with the present invention. For example, a variety of shapes of brake plates may be utilized. Also, in some circumstances, rigid extensions may be associated with the brake shoe and a resilient member may be associated with the brake plate, in an appropriate manner permitting rapid mounting and dismounting of the brake shoe in the brake mechanism.

The brake mechanism according to the present invention represents a significant improvement over conventional brake mechanisms. In particular, the brake shoes may be readily removed from the brake plates and checked for wear. Also, when replacement is necessary, the brake shoe may be rapidly and inexpensively replaced, especially without the necessity of special tools or training. Further, the brake shoes may be inexpensively manufactured from readily available materials, such as surgical tubing. Also, the brake plates are relatively simple in design and are relatively readily and inexpensively manufactured. The brake plates are also free from having special mechanisms thereon which may be likely to fail during use and possibly cause significant down time for the conveyor, or cause a hazardous situation. Additionally, the brake shoe and brake plate combination is particularly well adapted for use in cooperation with pneumatic brake control means such as small pneumatic jacks which can readily lift the brake shoe arms into and out of engagement with the conveyor rollers.

OBJECTS OF THE INVENTION

Therefore, the objects of the present invention are: to provide an improved brake mechanism for use with roller conveyors which includes a brake shoe that is rapidly and easily removable and replaceable therein; to provide such a brake mechanism which comprises a brake plate, a motive mechanism and a brake shoe; to provide such a mechanism in which the brake shoe is removably and replaceably mounted upon the brake plate for motivation by the motive mechanism into and out of engagement with selected rollers on the conveyor to cause braking thereof; to provide such a mechanism in which engagement between a brake shoe and the brake plate is by means of a resilient member engaging a rigid extension mechanism; to provide such a mechanism in which the brake plate includes a pair of rigid extensions thereon and the brake shoe includes a loop of resilient material which is stretchable between the rigid engagement extensions to mount the brake shoe on the brake plate; to provide such a mechanism in which the brake plate generally comprises an elongate rectangular plate having parallel end edges, each end edge having a rigid extension thereon; to provide such a mechanism in which the brake shoe generally comprises an elongate loop of resilient material; to provide such a mechanism in which the brake shoe comprises an elongate loop of surgical tubing; to provide such a brake mechanism which is relatively inexpensive to produce; and, to provide such a brake mechanism which is easy to manufacture, relatively simple to use and which is particularly well adapted for the proposed usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof. In some instances, dimensions of materials may be shown exaggerated, or reduced, for clarity.

BRIEF DESCRIPTION OF THE DRAWINGS

FIG. 1 is a fragmentary, side elevational view of a portion of a roller conveyor having conveyor brake mechanisms according to the present invention mounted therein.

FIG. 2 is a fragmentary, side elevational view of the invention shown in the environment of a roller conveyor and with portions broken away to show internal detail.

FIG. 3 is an enlarged, fragmentary, front elevational view of a portion of the assembly, shown in cooperation with a conveyor roller wherein the brake mechanism is in a non-braking orientation.

FIG. 4 is an enlarged, fragmentary, front elevational view of the brake mechanism, shown in an orientation engaging a conveyor roller, wherein the roller is braked, and having portions broken away to show internal detail.

FIG. 5 is an enlarged, top plan view of the brake mechanism according to the present invention and having portions broken away to show internal detail.

FIG. 6 is an enlarged, fragmentary, side elevational view of a portion of the brake mechanism with phantom lines showing an alternate orientation.

DETAILED DESCRIPTION OF THE PREFERRED AND ALTERNATIVE EMBODIMENTS

Figure 7:
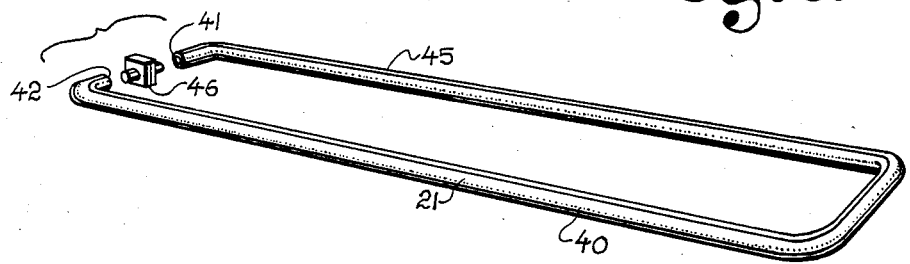
FIG. 7 is an enlarged, exploded perspective view of a portion of the brake mechanism according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an improved brake mechanism according to the present invention.

In FIG. 1, the brake mechanism 1 is shown mounted in cooperation with a roller conveyor 5. The roller conveyor 5 comprises a plurality of elongate rollers 6 rotatably mounted within the conveyor 5 and extending generally parallel to one another. The rollers 6 may be either powered or freely rotating, depending upon whether a power conveyor or gravity conveyor is involved.

FIG. 1 is a fragmentary view of an elongate roller conveyor having more than one brake mechanism 1 mounted therein. Rollers 8 are shown oriented for potential engagement with brake mechanism 9. Brake mechanism 9 is positioned, in FIG. 1, in non-braking relationship with respect to the rollers 8. Rollers 10 are shown positioned in an orientation of potential engagement with a second brake mechanism 11; and, in FIG. 1, brake mechanism 11 is shown in a braking relationship with respect to rollers 10, thus preventing rotation thereof. It will be understood that in FIG. 1, package 15, being transported by the roller conveyor 5, has had its motion braked by the brake mechanism 11.

Referring to FIG. 3, the brake mechanism 1 includes a brake plate 20, a brake shoe 21 and motive means or mechanism 22. The motive mechanism 22 selectively actuates the brake plate 20 between two extreme orientations. The first orientation, FIG. 3, is a non-braking orientation wherein the brake plate 20 and shoe 21 are spaced apart from the roller 6 and are out of engagement therewith. The second extreme orientation, FIG. 4, is with the brake plate 20 selectively actuated by the motive mechanism 22 to press the brake shoe 21 into engagement with the roller 6 to prevent rotation thereof. Generally, the brake shoe 21 is comprised of material having a sufficiently high coefficient of friction to be effective in preventing rotation of the roller 6. Also, when powered rollers are involved, generally when the brake mechanism 1 is actuated to cause the brake shoe 21 to engage the roller 6, the power drive to the roller 6 is temporarily disengaged, as through a clutch mechanism or the like. The brake mechanism 1 may be sized and oriented to engage only a single roller 6 or a plurality of rollers, FIG. 1, as desired.

Figure 8:
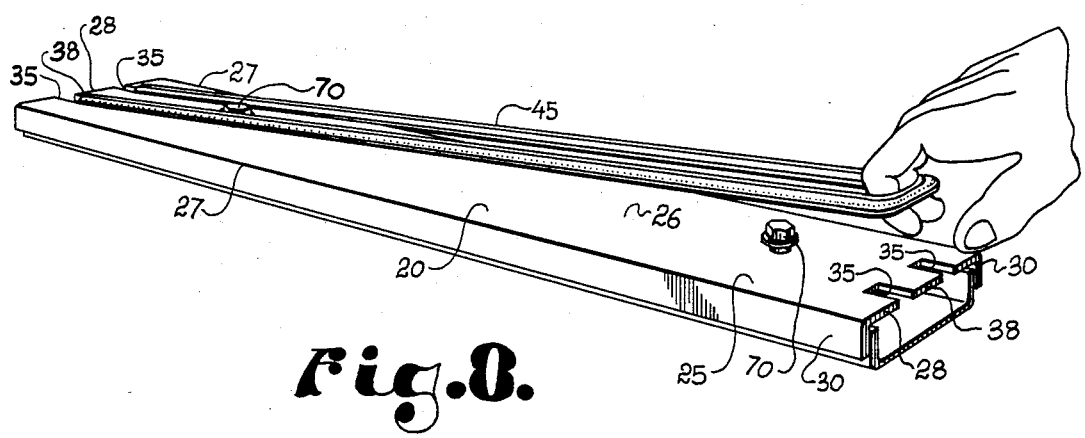
FIG. 8 is an enlarged, perspective view of a portion of the brake mechanism being shown with an operator replacing a brake shoe portion of the brake mechanism.

The brake plate 20, FIG. 8, generally comprises an elongate rectangular extension 25 having a brake shoe engaging surface 26, opposite generally parallel side edges 27 and opposite generally parallel end edges 28. In the preferred embodiment, FIG. 8, the brake plate 20 also includes side extensions or lips 30 which help to properly orient the brake plate 20 in the mechanism 1.

Referring again to FIG. 8, each end edge 28 of the brake plate 20 includes a pair of indentations 35 therein. As a result of the indentations 35, the end edges 28 each have an extension 38 thereon. The extensions 38 are generally oppositely oriented upon the brake plate 20. Generally, the brake plate 20, including the extensions 38, is manufactured from a rigid material such as metal or hard plastic. The extensions 38 are therefore rigid and a resilient member may be stretched between them. The rigid construction of the brake plate 20 permits the motive mechanism 22 to bias the brake plate 20 toward the roller 6, pressing the brake shoe 21 therebetween and generating braking.

Referring to FIG. 7, the brake shoe 21 comprises an elongate loop 40 of resilient material. By "resilient", it is meant that the brake shoe 21 is substantially elastic. In the preferred embodiment, FIG. 7, the resilient loop 40 has first and second ends 41 and 42 respectively, which are mounted generally coaxially to form a substantially continuous loop 45. In FIG. 7, the loop 45 is shown formed by having each of the loop ends, 41 and 42, mounted upon a connector 46. Conventional means such as adhesive, not shown, may be utilized to secure mounting of the tube ends 41 and 42 upon the connector 46.

The brake shoe 21 is mounted upon the brake plate 20 as shown in FIG. 8. Generally, the connector 46 is oriented adjacent one of the extensions 38, FIG. 3. The resilient loop 45 is then stretched over the brake shoe engaging surface 26 of the brake plate 20 until the opposite extension 38 can be engaged. After mounting, the resilient loop 45 extends between the two oppositely oriented extensions 38, FIG. 5. The resiliency, or elasticity, of the loop 45 generally secures the brake shoe 21 to the brake plate 20. When mounted in this manner, the loop 45 forms two parallel braking members which extend completely across the surface 26, FIG. 5.

Referring to FIG. 5, when the brake shoe 21 is mounted upon the brake plate 20, it will have two elongate and generally parallel brake shoe arms 50 extending across the brake shoe engaging surface 26. Referring to FIG. 4, as the brake plate 20 is biased toward the roller 6, the brake shoe arms 50 become trapped therebetween, generating the braking action.

Referring to FIGS. 3 and 4, the motive mechanism 22 includes a frame mechanism 55 and jack means 56. The frame 55 is a generally elongate extension 60 of rigid material. The frame 55 has opposite and parallel side edges 61. The side edges 61 generally engage the brake plate 20, FIGS. 3 and 8, when the brake plate 20 is in the first, or non-braking, orientation.

Referring to FIGS. 1 and 2, the brake mechanism 1 is maintained in a selected orientation with respect to the conveyor 5 and conveyor roller 6, by brackets 62 mounted upon the frame 55. A variety of conventional brackets 62 may be utilized in cooperation with the present invention. In FIG. 1, the brackets 62 comprise angle brackets 63 bolted upon the motive mechanism frame 55 and structural extensions 64 in the conveyor 5.

In the preferred embodiment, the motive mechanism 22 includes a pair of pneumatic jacks 65 positioned between the motive mechanism frame 55 and the brake plate 20. Referring to FIGS. 3, 4 and 8, the pneumatic jacks 65 extend generally completely between the frame 55 and the brake plate 20, and they are oriented so that extension of the jacks 65 biases the brake plate 20 toward the selected rollers 6 to be braked. Referring to FIG. 6, the pneumatic jacks 65 are of conventional design having a face 66 which may be rapidly biased, by control of air pressure within the the jack 65, to be moved through extended and retracted positions. In FIG. 6, an extended position is shown in phantom lines. It will be understood by reference to FIGS. 3 and 4 that when the jack 65 is in the extended position, FIG. 4, braking occurs. The pneumatic jacks are controlled by air pressure fed into and out of the jack 65 by means of air flow lines 67, FIG. 6. A conventional air pump control mechanism, not shown, may be utilized to control the pneumatic jacks 65. A variety of jacks, other than of pneumatic design, may be utilized in cooperation with the present invention. Referring to FIGS. 3, 4 and 8, bolts 70 generally provide a stop for the brake plate 20 when raised.

Figure 9:
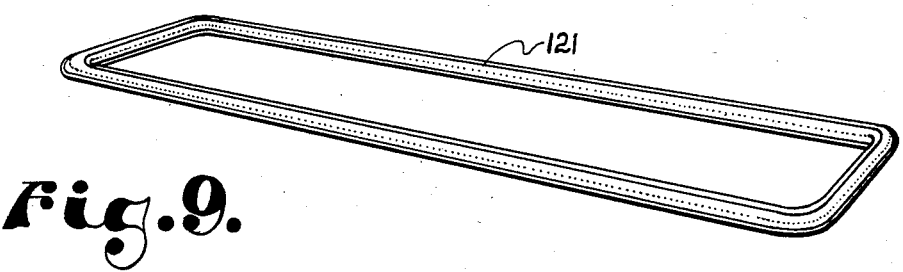
FIG. 9 is a side perspective view of an alternate embodiment of a portion of the brake mechanism according to the present invention.

Referring to FIG. 9, a brake shoe 121 of an alternate embodiment to that shown in FIG. 7, is illustrated. The brake shoe 121 in FIG. 9 is a continuous loop of sufficiently resilient material which has been either molded or otherwise constructed to make the connector 46 unnecessary. The brake shoe 121 of FIG. 9 may be utilized in cooperation with the brake plate 20 previously described.

It will be understood that the brake shoes 21 and 121 may be either hollow or solid. In the preferred embodiment, brake shoe 21 is a hollow tube formed from a length of surgical tubing or the like. Since tubular, the brake shoes 21 may be particularly rapidly and inexpensively manufactured. Further, during braking, FIG. 4, the tubing may tend to become smashed somewhat, leading to a slightly increased amount of surface area of brake shoe 21 being engageable to the rollers 6 to prevent rotation.

Referring to FIG. 8, the brake shoes 21 may be rapidly and easily mounted upon the brake plates 20 or removed therefrom. This significant advantage of the present invention over conventional brake mechanism designs allows brake shoes, in conveyor systems having many brake plates and shoes therein, to be rapidly and easily checked for wear, without the need for special tools and extensive down time. Further, when necessary, the brake shoes may be easily replaced. Finally, the brake shoes may be manufactured from relatively inexpensive and readily available materials, such as surgical tubing.

It is to be understood that while certain forms of the present invention have been illustrated and described herein, it is not to be limited to the specific forms or arrangement of parts described and shown.

What is claimed and desired to be secured by Letters Patent is as follows:

1. An improved brake mechanism for roller conveyors having a plurality of spaced, generally parallel aligned rollers; said brake mechanism comprising:
   (a) a movable brake plate having a first, non-braking, orientaion and a second, braking, orientation;
      (i) said brake plate having a brake shoe engaging surface with first and second end edges;
      (ii) said brake plate having a first rigid extension mounted substantially adjacent said first end edge, and a second rigid extension mounted substantially adjacent said second end edge;
   (b) motive means for selectively motivating said brake plate between said first, non-braking, orientation and said second, braking, orientation;
   (c) a brake shoe comprising an elongated band of resilient material formed in a substantially continuous loop;
      (i) said brake shoe being mounted on said brake shoe engaging surface by extension between said first and second rigid extensions, and being securely held thereon by resiliency of said loop;
      (ii) said brake shoe forming first and second discrete braking sections extending between said first and second rigid extensions and over said brake shoe engaging surface;
   (d) whereby whenever said brake plate is in said braking orientation, at least one roller is engaged by both of said transverse braking members, said roller being prevented from rotation thereby; and
   (e) whereby said brake shoe may be rapidly removed from said brake mechanism and replaced therein.

2. A brake mechanism according to claim 1 wherein said band of resilient material comprises an elongate, tubular, extension of said resilient material having first and second ends;
   said ends of tubular material being mounted in alignment with one another to form said substantially continuous loop.

3. A brake mechanism according to claim 1 wherein said band of resilient material is tubular, and has an inner longitudinal chamber extending therethrough.

4. An improved brake mechanism for roller conveyors having a plurality of spaced, generally parallel aligned rollers; said brake mechanism comprising:
   (a) a movable brake plate having a first, non-braking, orientation and a second, braking, orientation;
      (i) said brake plate being substantially rectangular and having first and second, opposite, end edges;
      (ii) said brake plate having a brake shoe engaging surface;
      (iii) said first and second end edges each having a pair of indentations therein, forming first and second oppositely oriented rigid extensions, each of said extensions being oriented to extend generally coplanar with said brake shoe engaging surface;
   (b) motive means for selectively motivating said brake plate between said first, non-braking, orientation and said second, braking, orientation;
   (c) a brake shoe comprising an elongated band of resilient material formed in a substantially continuous loop of;
      (i) said brake shoe being mounted on said brake shoe engaging surface by extension between said first and second rigid extensions, and being held thereon by resiliency of said loop;
      (ii) said brake shoe forming first and second discrete braking sections extending between said first and second rigid extensions and over said brake shoe engaging surface;
   (d) whereby whenever said brake plate is in said braking orientation, at least one roller is engaged by both of said transverse braking members, the roller being prevented from rotation thereby; and
   (e) whereby said brake shoe may be rapidly removed from said brake mechanism and replaced therein.

5. A brake mechanism according to claim 4 wherein said band of resilient material comprises an elongate, tubular, extension of said resilient material having first and second ends;
   said ends of tubular material being mounted in alignment with one another to form said substantially continuous loop.

6. A brake mechanism according to claim 4 wherein said band of resilient material is tubular, and has an inner longitudinal chamber extending therethrough.

* * * * *